United States Patent Office 2,906,793
Patented Sept. 29, 1959

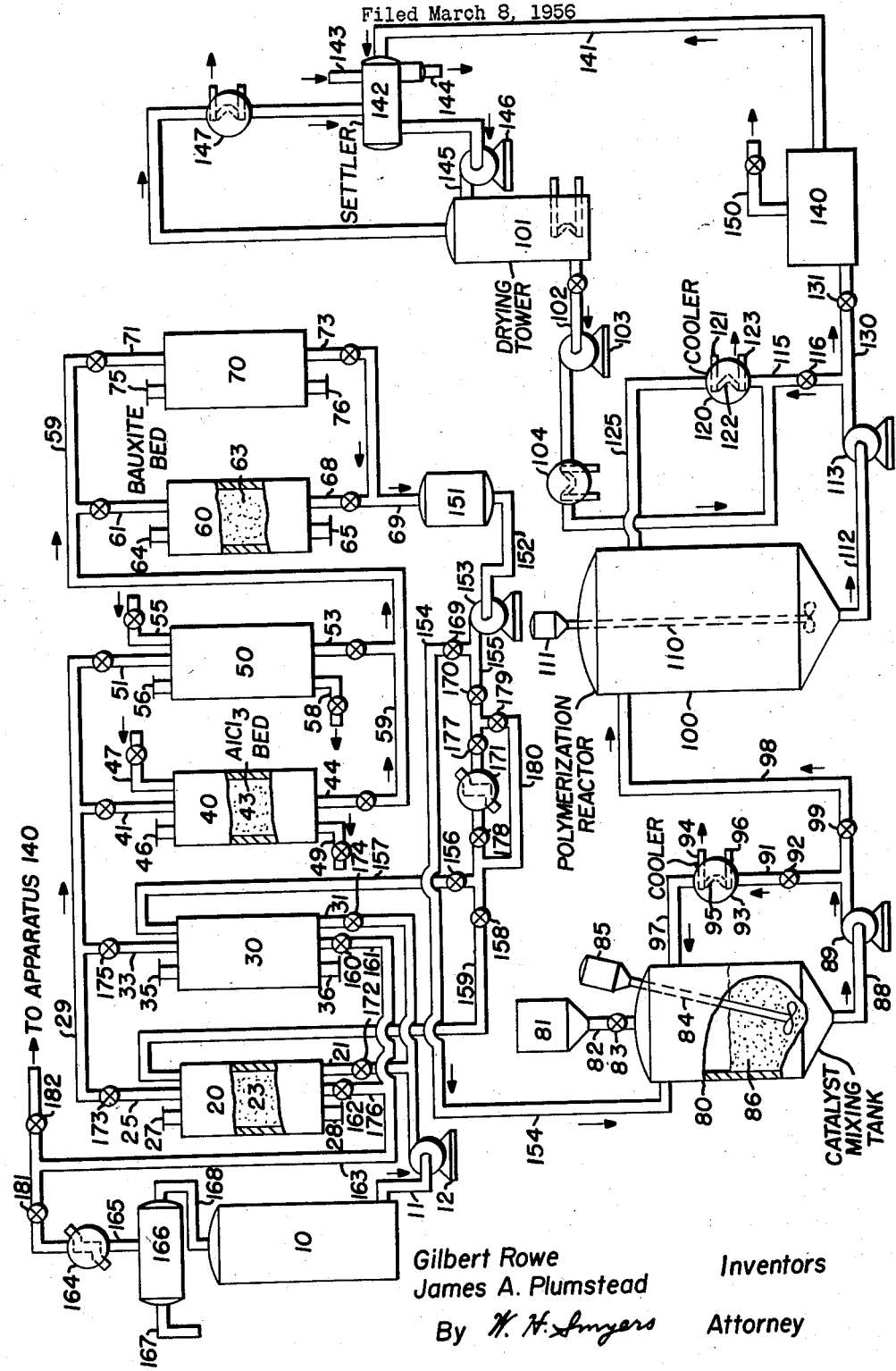
Sept. 29, 1959   G. ROWE ET AL   2,906,793
POLYMERIZATION OF ISOOLEFINS
Filed March 8, 1956
Gilbert Rowe
James A. Plumstead   Inventors
By W. H. Smyers   Attorney

2,906,793

POLYMERIZATION OF ISOOLEFINS

Gilbert Rowe, Clark, and James A. Plumstead, Florham Park, N.J., assignors to Esso Research and Engineering Company, a corporation of Delaware Application March 8, 1956, Serial No. 570,228

17 Claims. (Cl. 260—683.15)

This invention relates to polymerization and more particularly relates to an improved process for the preparation of monoolefin polymers. The present invention further concerns the pretreatment of the polymer hydrocarbon diluent such as a $C_5$ to $C_7$, preferably a $C_6$ relatively saturated hydrocarbon or hydrocarbons, e.g. commercial hexane, which is employed in the process of polymerizing $C_4$ to $C_7$ isoolefins. Still more particularly, the invention relates to a process for desiccating said polymer hydrocarbon diluent to a substantially dry condition involving a novel method of regenerating the desiccating agent whereby certain later processing problems are avoided.

The polymerization of isoolefins is well known in the art. Polymers of $C_4$ to $C_7$ isoolefins have been found to be particularly useful in a wide variety of commercial applications. Isoolefin polymers having a Staudinger molecular weight in the range of about 500 to 500,000 have been used extensively as wax and lubricating oil additives, oil thickeners, adhesives, cements, sealing and caulking compounds, etc. In particular, polymers of isobutylene having a molecular weight in the range of about 5,000 to 25,000 have been widely employed as useful lubricating oil additives. Isobutylene polymers of this molecular weight when added to lubricating oil compositions serve as viscosity index improvers and thickeners in the lubricating oil compositions.

Polyisobutylenes having a molecular weight of about 500 to 50,000 and higher have been prepared heretofore employing a Friedel-Crafts type catalyst to effect the polymerization of isobutylene. Conventionally, the polymerization of isobutylene is carried out in the presence of an inert diluent such as n-butane, methyl chloride, carbon dioxide, isopentane, n-pentane, isohexane, cyclohexane, n-hexane, etc. Aromatics such as benzene, toluene, etc. have been employed as diluents but generally are avoided due to their tendency to alkylate with the reacting olefins and/or form complexes with the catalyst. It has been found that the polymerization of isobutylene can be most effectively carried out on a commercial scale employing a finely divided aluminum halide as a polymerization catalyst and substantially dry commercial hexane as an inert diluent in the process. The use of an aluminum halide catalyst, particularly aluminum chloride, is simpler and considerably less expensive than the use of other Friedel-Crafts type catalysts such as boron trifluoride. Also, the use of a hydrocarbon diluent such as substantially dry commercial hexane in the polymerization reaction is superior to other diluents such as methyl chloride. For example, the polyisobutylene product is soluble in commercial hexane but insoluble in methyl chloride. In addition, halogenated hydrocarbon solvents are relatively expensive and subject to hydrolysis. The latter complicates the fractionation and recovery steps subsequent to polymerization. Commercial hexane is not subject to such hydrolysis problems.

Although the preparation of polyisobutylene employing an aluminum chloride catalyst and commercial hexane as a diluent has had outstanding commercial success, this process has not been entirely free from certain process difficulties. In general, the polymerization of isobutylene in this process is carried out by initially admixing the aluminum chloride catalyst and the commercial hexane to form a catalyst slurry. Then the catalyts slurry and isobutylene are admixed in a low temperature polymerization zone to effect the polymerization of the isobutylene.

In carrying out this process, it has been found that the presence of water in substantial amounts in the polymer hydrocarbon diluent creates certain processing problems such as the icing of transfer lines, heat exchanger surfaces, valves and the like which may cause not only progressive reaction deterioration but also may necessitate periodic shutdowns in order to de-ice various equipment. The reaction deteriorates with de-icing of the heat exchanger surfaces due to loss of cooling capacity and subsequent rise of temperature within the polymerization reactor. Such a rise in temperature causes the production of undesirably large amounts of low molecular weight polymer. Alternatively even with relatively slight icing, process fluctuations are encountered which in turn produce a non-uniform polymer product and/or a product having a relatively wide molecular weight spread.

The presence of water in the polymer hydrocarbon diluent also produces serious problems involving the polymerization catalyst. For example, even small quantities of water deactivate the catalyst to an appreciable degree and hydrolysis of aluminum chloride produces undesirable hydrochloric acid which corrodes auxiliary equipment leading to or from the reactor such as conduits, valves, pumps, heat exchanges, flare release lines, etc. In view of the foregoing, it is essential that the polymer hydrocarbon diluent be substantially free of water.

Various methods have been proposed in the prior art to overcome and alleviate the presence of water. In general, these processes have comprised the use of one or more drying zones containing beds of a solid desiccant, such as alumina gel, preferably having a particle size in the range of about 4 to 20 mesh. However, it has been found that the desiccant, particularly if it is alumina (which is the preferred desiccant), gradually increases in contained water content and loses efficiency in the drying operation. Therefore it is necessary to return the alumina, or other desiccant, to its original efficiency by periodically regenerating the same in order to remove the water.

Various methods have been attempted in order to accomplish such drying of an alumina desiccant. One such method has comprised passing a hot refinery inert gas stream preheated to a temperature sufficient to volatilize water through the desiccant. However it was found upon cooling, that the alumina had been only partially regenerated to an extent such that upon return to drying service the effluent polymer hydrocarbon diluent contained between about 25 and 50 parts per million of water which is several times more than permissible.

Another procedure has comprised passing preheated ethane through the desiccant at a temperature sufficient to volatilize water. This procedure, however, involves an explosion hazard. The process is also somewhat wasteful in that the wet ethane containing some hexane has to be burned off by means of a refinery flare. Furthermore, the ethane stream contains some ethylene which under the regeneration temperature conditions polymerizes on the desiccant progressively fouling the desiccant and reducing the desiccant life.

In both of the above processes, i.e. when employing an inert refinery gas stream or ethane in an attempt to regenerate the desiccant, a substantial portion of polymer hydrocarbon diluent which remained on the surface of the desiccant particles after draining of the desiccant zone is lost being vaporized and vented along with the regeneration gas.

In accordance with the invention, previously dried hydrocarbon-diluent for the polymer is vaporized, superheated to a temperature of between about 350° and 600° F., advantageously between about 400° and 550° F., preferably between about 450° and 550° F. and passed through the drier containing a bed of desiccant at substantially the superheating temperature in a direction countercurrent to normal diluent flow during the drying period for a time sufficient substantially to dry the desiccant. The polymer diluent vapor containing water removed from the desiccant is condensed and sent to a separation zone where the water is decanted. Following the foregoing period of heating the bed by the flow of superheated, previously dried hydrocarbon diluent in vapor form; the desiccant bed is cooled by the passage therethrough of previously dried hydrocarbon diluent in liquid form.

By the foregoing procedure, in accordance with the invention, the desiccant such as alumina, is substantially completely regenerated (i.e. substantially completely dried) and when the regenerated desiccant is employed in the drying of polymer hydrocarbon diluent, the desiccant is capable of reducing the water content in the diluent to the satisfactory level of less than about 10 parts and generally to less than about 5 parts of water per million parts of diluent. Contact times equivalent to space velocities of between about 0.1 and 20.0 volumes of diluent per volume of desiccant per hour are usually adequate for this purpose. For the purpose of the invention, it is desirable to have at least two drying zones in the process which may be operated alternately on drying and regeneration cycles.

The invention will be best understood by the following description in which reference will be made to the drawing wherein the single figure is a diagrammatic representation depicting a flow plan of an embodiment of the present invention.

Referring now to the drawing, reference numeral 10 depicts a storage tank containing commercial hexane which is employed as a diluent in the method of the present invention. Commercial hexane, which boils within the range of about 150° to 160° F., is generally obtained as a narrow cut from casinghead gasoline or from a virgin naphtha by distillation. Generally, the commercial hexanes available on the market have the following approximate composition:

| Component: | Volume |
| --- | --- |
| n-Hexane | 25–70 |
| Iso-hexanes | 5–35 |
| Benzene | 1–10 |
| $C_6$ cycloaliphatics | 10–60 |
| $C_6$ olefins | 0.1–3.0 |
| Iso-heptanes | 5–20 |

The exact composition of a particular commercial hexane will depend upon (1) the crude oil source and (2) the degree of fractionation employed. It will be understood, however, that in general the commercial hexanes on the market have the above approximate composition and that such commercial hexanes as well as their equivalents may be employed in the present invention. The commercial hexane will also contain various amounts of water in the range of about 30 to 300 parts per million.

The hydrocarbon diluent in tank 10 is pumped through line 11 by means of pump 12 to either one or both of driers 20 and 30. These driers contain beds of a desiccant, such as alumina gel, having a particle size in the range of about 4 to 20 mesh. The function of driers 20 and 30 during the drying period is to remove the water present in the commercial hexane. More specifically, the commercial hexane from tank 10 is pumped through lines 11 and 21 into drier 20 containing bed 23 of alumina gel. The dried commercial hexane from bed 23 of drier 20 is then passed into line 29. Drier 20 is provided with ports 27 and 28 located respectively on the top and bottom of drier 20 so that fresh alumina gel may be charged to drier 20 through port 27; and after the alumina gel has become exhausted as a drying medium it may be removed from drier 20 through port 28. Drier 20 is also provided with a regenerating polymer hydrocarbon diluent vapor inlet conduit 159, outlet valve 162 and conduit 163 for use when the alumina gel desiccant is to be regenerated in accordance with the invention as more fully described hereinafter.

During the time drier 20 is being refilled or regenerated, the commercial hexane is passed into drier 30 through lines 11 and 31 and removed from the bed of alumina gel in drier 30 through lines 33 and 29. Drier 30 is provided with port 35 for introducing fresh alumina gel thereto and port 36 for withdrawing exhausted alumina gel therefrom. Drier 30 is also provided with a regenerating hydrocarbon vapor inlet conduit 157, outlet valve 160 and conduit 161 in the same general manner as for drier 20.

Although the flow of the commercial hexane through driers 20 and 30 as shown in the figure is upward, it will be understood that, if desired, the flow through the driers may be downward by changing the piping arrangement therefor. The regeneration conduits would then also be reversed. Only one drier need be employed but it is preferred to use two driers because, in such case, the commercial hexane may be dried continuously by employing driers 20 and 30 on an alternating basis while the drier not employed is regenerated in accordance with the invention. The commercial hexane may be passed through drier 20 and/or drier 30 either on a continuous or intermittent basis. Rates of about 0.1 to 20, advantageously .25 to 10, preferably .5 to 5, v./v./hour (volume of diluent per volume of desiccant per hour) may be employed in general. Drying temperatures of about 40 to 200° F., preferably about 70 to 120° F., may be employed.

The dried commercial hexane is next preferably passed through a bed of relatively coarse particles of aluminum chloride to minimize the formation of sludge in the process. This is accomplished as shown in the figure by passing the dried commercial hexane through column 40 and/or 50, each of which contains a bed of relatively coarse particles of aluminum chloride. More particularly, the dried commercial hexane may be passed through lines 29 and 41 upwardly (or downwardly as shown) through column 40 containing bed 43 of aluminum chloride particles. The aluminum chloride treated commercial hexane is withdrawn from column 40 through lines 44 and 59. Simultaneously or alternatively to the passage of the commercial hexane through column 40, the commercial hexane may also be passed upwardly (or downwardly as shown) through column 50 via lines 29 and 51. The aluminum chloride treated commercial hexane is withdrawn from column 50 through lines 53 and 59.

Column 40 is provided with port 46 which may be employed to charge fresh aluminum chloride to column 40. Similarly, column 50 is provided with port 56 for charging fresh aluminum chloride to column 50. Upon exhaustion of the aluminum chloride, that is, when the aluminum chloride loses its effectiveness to prevent the formation of sludge in the process, the aluminum chloride in the beds is conveniently removed by dumping the same out bottom conduits 49 and 58. The aluminum chloride, thus removed, is soluble in water and may be conveniently washed away into the sewer or other suitable disposal system. Fresh aluminum chloride beds are then employed in columns 40 and 50.

It will be understood that tower 40 and tower 50 may be employed simultaneously or alternatively in this process. The alternative utilization of towers 40 and 50 is preferred since this permits a continuous process in that one of the columns may be employed for treating while the aluminum chloride bed of the other is being replaced. As beforementioned, the flow of commercial hexane through towers 40 and 50 may be either in an upward or a downward direction, as desired. An upward direction of flow is generally preferred for liquid drying. Further, it will be understood that the flow of the commercial hexane through columns 40 and 50 may be either on a continuous or intermittent basis, as desired; a continuous basis being preferred.

Treating rates of about 0.25 to 50 v./v./hour (volume of diluent per volume of aluminum chloride per hour), preferably about 0.5 to 15 v./v./hour, may be employed in the process. Treating temperatures in the range of about 0° to 200° F., preferably about 75° to 100° F., may be employed. About 10 to 200 gallons of commercial hexane may be passed through the aluminum chloride beds in columns 40 and 50 per pound of aluminum chloride before it is necessary to replace the aluminum chloride beds. Preferably the capacity of the aluminum chloride beds is maintained in the range of about 15 to 100 gallons of commercial hexane per pound of aluminum chloride. The particles of aluminum chloride in columns 40 and 50 are preferably of a size in the range of about 2 to 20 mesh, more preferably about 4 to 8 mesh.

The aluminum chloride treated commercial hexane is then preferably filtered by being passed through a bed of relatively coarse particles of bauxite. More particularly, the aluminum chloride treated comercial hexane is passed through columns 60 and/or 70. Thus the aluminum chloride treated commercial hexane may be passed through lines 59 and 61 into column 60 and through bed 63 of bauxite contained in column 60. The resultant bauxite-filtered commercial hexane is then withdrawn from column 60 through lines 68 and 69. Column 60 is provided with port 64 which may be employed to charge fresh bauxite to column 60 and with port 65 which may be employed to withdraw exhausted alumina therefrom. Simultaneously or alternatively to the passage of the commercial hexane through column 60, the commercial hexane may be passed through column 70 which also contains a bed of relatively coarse particles of bauxite. This may be accomplished by passing the commercial hexane through lines 59 and 71 through the bed of alumina contained in column 70. The bauxite-filtered commercial hexane is then removed from column 70 through lines 73 and 69. Column 70 is provided with port 75 which is employed to charge fresh bauxite to column 70 and with port 76 which is employed to remove exhausted bauxite therefrom. It will again be understood that column 60 and column 70 may be used on either a simultaneous or alternative treating basis. Likewise the commercial hexane may be passed either in an upward or downward direction through the bed of bauxite, as desired (by changing the piping arrangement). An upward direction is preferred. It will also be understood that the commercial hexane may be passed either continuously or intermittently through columns 60 and 70. Alumina gel or other similar porous material or mechanical filtration may be used in place of the bauxite filtering medium. Driers 20 and 30, and columns 40, 50, 60 and 70 advantageously have an internal volume of between about 1 and 100 cubic feet, preferably between about 5 and 50 cubic feet, especially between about 10 and 30 cubic feet.

Filtering rates in the range of about 0.1 to 20 v./v./hour (volume of diluent per volume of bauxite per hour), preferably about 0.5 to 5.0 v./v./hour, may be employed through columns 60 and 70. Treating temperatures in the range of about 0° to 200° F., preferably about 75° to 100° F., may be employed. In general, the bed of bauxite will be replaced after about 1 to 100 gallons, preferably about 5 to 50 gallons, of commercial hexane have been passed through the alumina bed per pound of bauxite. Preferably bauxite bed capacities in the range of about 10 to 30 gallons of commercial hexane per pound of bauxite are employed. The particle size of the bauxite in the beds of columns 60 and 70 should generaly be in the range of about 2 to 20 mesh, preferably about 4 to 8 mesh.

The dried, aluminum chloride treated, bauxite treated commercial hexane is then passed through line 69 into dry diluent storage zone 151. From this zone, dry diluent is pumped via conduit 152 by pump 153 through valve 169 via conduit 154 into catalyst mixing tank 80 wherein the treated, substantially dry commercial hexane is admixed with the finely divided aluminum chloride catalyst which is to be used in the polymerization reaction. The aluminum chloride catalyst employed in the process is in dry powder form, having a particle size in the range of about 10 to 50 mesh, preferably about 20 to 40 mesh. The finely divided aluminum chloride catalyst is stored in hopper 81 and is introduced into tank 80 through line 82 by opening valve 83 therein. Tank 80 is provided with stirrer 84 which is driven by motor 85 to maintain the finely divided aluminum chloride catalyst in suspension in the commercial hexane slurry medium. Generally, the resultant aluminum chloride-commercial hexane slurry 86 will contain about 0.5 to 10 weight percent, preferably about 1 to 5 weight percent, of aluminum chloride based on total slurry. Catalyst slurry 86 is removed from tank 80 through line 88 by means of pump 89, preferably continuously. A portion of catalyst slurry 86 is advantageously passed continuously through line 91 by opening valve 92 therein through cooler 93 and is then circulated through line 97 back to tank 80. Cooler 93 is provided with line 96 for introducing a coolant such as liquid ammonia or propane or a chilled brine solution into cooling coil 95, the coolant being removed by means of line 94. By recycling a portion of slurry 86, the temperature of the slurry is reduced to and maintained at a temperature in the range of about −40 to +60° F., preferably about −20 to +10° F.

The remainder of catalyst slurry 86 (which has been cooled) is passed through line 98 preferably continuously by opening valve 99 into polymerization reactor 100. A dry $C_4$ to $C_7$ isoolefin such as isobutylene which is to be polymerized in reactor 100 is passed from tower 101 (hereinafter described in further detail) and is then passed through cooler 104 into reactor 100 through line 102 by means of pump 103. Reactor 100 is provided with stirrer 110 which is operated by motor 111. In reactor 100, the catalyst slurry and the isobutylene are admixed by means of stirrer 110 to effect the polymerization of the isobutylene. The reaction may be carried out by a batch or continuous process, as desired. The resultant reaction mixture in reactor 100 is withdrawn preferably continuously therefrom through line 112 by means of pump 113. A portion of the reaction mixture is passed through line 115 by opening valve 116 therein. This portion of the reaction mixture is circulated through cooler 120 and thereafter through line 125 back to reactor 100. A coolant is introduced into cooler 120 entering through line 121 passing through cooling coil 122 and removed therefrom by means of line 123. A coolant such as liquid ammonia, propane, or ethane may be employed. Cooler 120 is employed to cool the aforementioned circulating reactor stream to thereby maintain the polymerization temperature in reactor 100 at the desired level.

The remainder of the reaction mixture withdrawn from reactor 100 through line 112 is passed through line 130 by opening valve 131 therein. This portion of the reaction mixture is passed through line 130 to separation and recovery equipment 140 wherein the resultant polymer product is recovered from the remainder of the reaction mixture and wherein unreacted isobutylene, the commercial hexane diluent and the aluminum chloride catalyst complexes and residues are separated from the reaction product. A number of conventional separation techniques may be employed. In the drawing, the reaction mixture in line 130 is passed to recovery and separation apparatus 140 wherein the polymer product is separated from the other components of the reaction mixture. In apparatus 140 the commercial hexane diluent and unreacted isobutylene are flashed overhead from the reaction mixture in a flashing tower, condensed in a condenser, passed into a settler from which water is removed, and are then passed through line 141 to settler 142. Fresh isobutylene is also passed to settler 142 through line 143. Water settling out in settler 142 is removed through line 144. The hydrocarbons (commercial hexane and isobutylene) containing traces of water are passed from settler 142 to azeotropic drying tower 101 through line 145 by means of pump 146. The dried hydrocarbon product is withdrawn from the bottom of tower 101 through line 102, passed through cooler 104 and recycled to reactor 100. An overhead stream is withdrawn from tower 101, condensed in condenser 147 and passed to settler 142 for separating water from the hydrocarbons as described heretofore. Hexane and isobutylene may be purged from apparatus 140 through line 150 to offsite tank (not shown).

The polymerization reaction carried out in reactor 100 will generally be performed at reaction temperatures in the range of about −75° to +10° F. Preferred reaction temperatures are in the range of about −50° to 0° F. In general, reactor residence times in the range of about 0.2 to 4.0, preferably about 0.5 to 2.0 hours will be employed. In general, the proportions of hydrocarbon diluent to isobutylene which will be employed will be in the range of about 50–75% by weight of the hydrocarbon diluent and 25–50% by weight of isobutylene. Preferred proportions on a weight basis are about 60 to 70% hydrocarbon diluent and 30 to 40% of isobutylene. Generally the isobutylene employed will be of at least about 98% purity (i.e., at least about 98 weight percent isobutylene and not more than about 2% of hydrocarbons having boiling points close to that of isobutylene). It will be understood, of course, that it is preferred to use isobutylene of high purity but that butylene fractions containing lesser amounts of isobutylene may be employed in the present process if desired. The reaction conditions may be varied to produce isobutylene polymers having Staudinger molecular weights from about 500 to 50,000. In general, the present process will be employed to produce isobutylene polymers having Staudinger molecular weights from about 5,000 to 25,000, more particularly about 15,000 to 20,000, which latter isobutylene polymers are particularly useful as viscosity improvers for lubricating oil compositions. The final reaction mixture produced in reactor 100 will comprise about 10 to 35 weight percent of polyisobutylene, about 2 to 20% of unreacted isobutylene, about 50 to 75% of hydrocarbon diluent such as commercial hexane and about 0.04 to 0.4% of aluminum chloride catalyst, the percentages being expressed on a weight basis.

In practicing the present invention, when it is desired to regenerate the solid desiccant in either drier 20 or drier 30, the appropriate valves of the drier to be regenerated are closed to the drying system and opened to the regeneration system as more fully described hereinafter. For instance, if the drying process has been operated in a manner that drier 20 has been used, drier 30 being previously regenerated, diluent inlet valve 172 of drier 20 is closed as is diluent outlet valve 173. Simultaneously diluent inlet valve 174 to drier 30 and diluent outlet 175 are opened, the drying period now being continuously conducted through drier 30, drier 20 being on a regeneration period.

A small proportion of the dry hexane from diluent storage zone 151 is then pumped by pump 153 via conduit 155 through valve 170 (which is opened) past closed valve 179 through open valve 177 into superheater 171. The superheater completely vaporizes and superheats the diluent (e.g. hexane) to a temperature advantageously between about 350° and 600° F. This superheated vapor is then passed into conduit 159 through open valve 178 and open valve 158, valve 156 remaining closed. The superheated vapor travels through conduit 159 and is injected into drier 20 so as to travel through drier 20 in a manner countercurrent to that of the flow of diluent liquid during the drying cycle. The superheated diluent vapor then passes from drier 20 via conduit 176 through opened valve 162 into conduit 163 which leads to condenser 164 through open valve 181 past closed valve 182. In this condenser, the diluent (e.g. hexane) and water are cooled to a temperature sufficient to return them to the liquid state. They then pass through line 165 into decanter 166 where water is discarded via line 167, the hexane being passed via conduit 168 back to hexane diluent storage tank 10.

Alternatively, valve 181 may be closed and valve 182 opened to pass the superheated diluent vapor to the condenser (previously described but not shown) in apparatus 140. There the superheated diluent vapor is condensed and passed into a settler (not shown) from which water may be removed and discarded.

At the conclusion of the foregoing heating portion of the regeneration period, the cooling portion of the regeneration period is commenced. In this cooling portion, valves 177 and 178 are closed, valve 179 being opened to permit cool dry diluent liquid from diluent storage zone 151 to pass via conduit 152, pump 153, conduit 155, valve 170, valve 179, conduit 180, valve 158, and conduit 159 into drier 20 in a manner countercurrent to that of the flow of diluent liquid during the drying period. The purpose for passing the dry diluent liquid through driers 20 and 30, after the heating portion of the regeneration period, is to cool said driers to a temperature at which they may be used in the drying period. The temperature level of the dry diluent liquid is generally between about 40° and 100° F. The dry diluent liquid passes from drier 20 via conduit 176 through opened valve 162 into conduit 163 which leads to condenser 164 through open valve 181 past closed valve 182. The diluent (e.g. hexane) is cooled and passed through line 165 into decanter 166, then via conduit 168 into diluent storage tank 10. Alternatively, valve 181 may be closed, valve 182 opened and the dry diluent liquid passed into apparatus 140 to the condenser and settler (not shown) therein.

If, at any time during the regeneration period, additional dry diluent liquid is required in catalyst mixing tank 80, valve 169 may be partially opened without disturbing the regeneration procedure in accordance with the present invention.

Drier 20 is now completely regenerated and may be used in the drying period when drier 30 is subsequently being regenerated in the same general manner hereinbefore described for the regeneration of drier 20.

By regenerating the desiccant in accordance with the invention as described above, the drying period may be continued for between about 20 and 200 hours, preferably between about 25 and 50 hours. The regeneration period is generally between about 1 and 20 hours, preferably between about 5 and 15 hours. Of the foregoing times in the regeneration period, about ⅔ to 9/10 is consumed in the heating portion, the remainder being consumed in the cooling portion.

A specific example of the improved method of the present invention will now be described in detail. The commercial hexane employed in this example has the following approximate composition:

| Component: | Volume Percent |
| --- | --- |
| n-Hexane | 44 |
| Iso-hexanes and -heptanes | 30 |
| Benzene | 5.5 |
| $C_6$ cycloaliphatics | 20 |
| $C_6$ olefins | 0.5 |

This commercial hexane is derived from a light virgin naphtha and has a boiling range of about 150° to 160° F. The commercial hexane also contains about 200 parts per million of water. About 5100 gallons of this commercial hexane are pumped from tank 10 through bed 23 of drier 20. The rate of passage of the commercial hexane through bed 23 is about 1 v./v./hour. Bed 23 consists essentially of particles of alumina gel of about 4 mesh. The temperature of the bed is about 75° F. The resultant dried commercial hexane from drier 20 contains about 5 parts per million of water.

The dried commercial hexane is then passed through aluminum chloride bed 43 of column 40. The particles of aluminum chloride have a size of about 4 mesh. The rate of passage of the commercial hexane through bed 43 is about 1.5 v./v./hour and the temperature of the bed is about 80° F. Bed 43 of aluminum chloride is replaced after about 25 gallons of commercial hexane per pound of aluminum chloride have been passed therethrough.

The aluminum chloride treated commercial hexane is then passed into column 60 and through bed 63 of bauxite contained therein. The particles of bauxite in bed 63 have a size of about 4 mesh. The rate of passage of the commercial hexane through bed 63 is about 1.0 v./v./hour. The temperature of bed 63 is about 90° F. Bed 63 of bauxite is replaced after about 25 gallons of commercial hexane per pound of bauxite have passed therethrough.

The resultant dried, aluminum chloride treated, bauxite filtered commercial hexane flows intermittently at a rate of about 170 g.p.h. into mixing tank 80 wherein sufficient finely divided aluminum chloride catalyst is admixed therewith from hopper 81 to form a catalyst slurry containing about 4 weight percent of aluminum chloride catalyst. In this example, the aluminum chloride catalyst has a particle size of about 20 mesh. The resultant catalyst slurry is stirred vigorously by means of stirrer 85 and is withdrawn from tank 80 through line 88 at the rate of about 4280 g.p.h. About 4200 g.p.h. of catalyst slurry are passed continuously through cooler 93 and recycled back to tank 80. By this means, the temperature of the catalyst slurry passing through line 88 is maintained at a temperature of about 0° F.

About 80 g.p.h. of catalyst slurry are passed continuously through line 98 into polymerization reactor 100. About 500 g.p.h. of high purity fresh isobutylene (99 weight percent isobutylene) are continuously fed into settler 142. Simultaneously, 1690 g.p.h. of recycle hexane and unreacted isobutylene from separation and recovery apparatus 140 also enter settler 142, the total hydrocarbon phase including feed isobutylene being refluxed to the azeotropic drying tower 101 and then passed to reactor 100. The catalyst slurry and isobutylene and hydrocarbon diluent (commercial hexane) are continuously stirred by means of stirrer 110. About 2200 g.p.h. of the reaction mixture in reactor 100 are continuously withdrawn therefrom through line 130. Of the 32,000 g.p.h. of reaction mixture passing through line 112, about 29,800 g.p.h. thereof (plus feed from drying tower 101) are passed through line 115 to cooler 120 and thereafter recycled to reactor 100 through line 125. By this recycle cooling, the temperature in reactor 100 is maintained at about −40° F. The average residence time of the materials in reactor 100 is about 1 hour.

The remainder of the reaction mixture passing through line 112 is withdrawn through line 130 and passed to separation and recovery apparatus 140. This reaction mixture comprises about 18 weight percent of polyisobutylene product having a molecular weight of about 18,000, about 12 weight percent of unreacted isobutylene, about 70 weight percent of commercial hexane and about 0.2 weight percent of aluminum chloride catalyst and these components of the reaction mixture are separated from each other.

After about 30 hours on stream it is found that the efficiency of drier 20 has been reduced to a point where the alumina desiccant requires regeneration as indicated by increasing water content of the effluent hexane. At this time hexane inlet conduit valve 172 and outlet valve 173 are closed with the simultaneous opening of the corresponding valves 174 and 175 into drier 30; said latter valves being previously closed. Valve 170 is then opened whereby to permit a portion of the dry hexane in diluent storage zone 151 to pass through line 152, and be pumped by pump 153 via conduit 155 past closed valve 179 through open valve 177 into superheater 171. In this superheater the hexane is volatilized and superheated to a temperature of about 450° F. by steam superheated under a pressure of 600 p.s.i.g. The hexane vapor, thus superheated, is then passed from superheater 171 through open valve 178 past closed valve 156 through open valve 158 into conduit 159 leading into alumina drier 20. The superheated hexane vapor is then passed through drier 20 in a direction countercurrent to that of hexane liquid during the drying cycle. The rate of passage of the hexane vapor through bed 23 of drier 20 is about 160 v./v./hour. The hexane vapor and the water vapor removed thereby then pass via conduit 176 through opened valve 162 into conduit 163 leading into condenser 164 through open valve 181 past closed valve 182. In condenser 164 both the water and the hexane are returned to the liquid state. Both liquids are then passed via conduit 165 into decanter 166, in which the water is drawn off and discarded via line 167; the hexane being returned via line 168 to storage tank 10. Alternatively, valve 181 may be closed, the valve 182 opened to pass the superheated diluent vapor to the condenser and settler in apparatus 140. The total time for the heating section of the regeneration period is about 15 hours.

At this time, valves 177 and 178 are closed and valve 179 is opened to permit dry hexane liquid from diluent storage tank 151 at 75° F. to pass through and cool bed 23 of drier 20. The hexane liquid passes via conduit 176, valve 162, conduit 163 into condenser 164, then into decanter 166 and via line 168 to storage tank 10. Alternatively, valve 181 may be closed and valve 182 opened to pass the liquid hexane to the condenser and settler in apparatus 140. The total time for the cooling section of the regeneration cycle is about 2 hours. The cooling liquid passage rate through bed 23 of drier 20 is about 0.5 v./v./hour.

When, by suitable manipulation of the valves leading into the driers, alumina drier 30 is taken off stream and alumina drier 20 subsequently put back on stream, it is found that the hexane which has been treated by the alumina desiccant thus regenerated, contains less than 5 parts per million of water. It is also found that the regeneration of the alumina desiccant in drier 20 is accomplished so efficiently that the drier may be used on stream for about 30 hours before it is subsequently required to again be regenerated.

It has been found that when employing the improved method of the present invention for example as described in the specific example above, the presence of water in the polymer hydrocarbon diluent has been essentially eliminated. Also, the regeneration of the alumina disiccant is substantially complete. In addition, the aluminum chloride catalyst has performed more effectively. Furthermore, the improved process has promoted the formation of polyisobutylene having a more uniform molecular weight. Also, it has not been necessary to shut down the apparatus to unplug lines, valves, meters and the like. In general, process control has been improved substantially by the method of the present invention.

Resort may be had to various modifications and variations without departing from the spirit of the invention or the scope of the appended claims.

What is claimed is:

1. In a method of preparing polyisobutylene having a molecular weight in the range of about 500 to 50,000 wherein a finely divided aluminum halide catalyst having a particle size of about 20 to 40 mesh is admixed with commercial hexane boiling within the range of about 150° to 160° F. to form a catalyst slurry containing about 1 to 4 wt. percent of aluminum halide, which catalyst slurry is then admixed with isobutylene to thereby effect the polymerization of said isobutylene, the improvement which comprises passing said commercial hexane, prior to admixture with said finely divided aluminum halide catalyst, through a bed of alumina gel which has been periodically regenerated by heating with a substantially dry $C_5$ to $C_7$ hydrocarbon in superheated vapor form at a temperature between about 350° and 600° F., and cooling with a substantially dry $C_5$ to $C_7$ hydrocarbon in liquid form to a temperature between about 40° and 100° F.

2. Method according to claim 1 in which the commercial hexane vapor formed is subsequently condensed, separated from entrained water, and recycled.

3. Method according to claim 1 wherein said commercial hexane is passed through a bed of aluminum chloride and then passed through the bed of alumina gel prior to admixture with said aluminum halide catalyst.

4. Method according to claim 1, wherein the wet super heated $C_5$ to $C_7$ hydrocarbon vapors formed are subsequently condensed, separated from entrained water, and recycled.

5. Method according to claim 1 wherein the super heated vapors of the dry $C_5$ to $C_7$ hydrocarbon, during regeneration of the bed of alumina gel, are passed through said bed in a direction countercurrent to normal flow of the commercial hexane during drying of said commercial hexane.

6. Method according to claim 1 wherein the $C_5$ to $C_7$ hydrocarbon in both instances is a $C_6$ hydrocarbon.

7. Method according to claim 1 in which the alumina gel is periodically regenerated at a temperature between about 400° and 550° F.

8. In a method of preparing polyisobutylene having a molecular weight in the range of between about 10,000 to 25,000 wherein a finely divided aluminum chloride catalyst having a particle size of about 20 to 40 mesh is admixed with commercial hexane boiling within the range of about 150° to 160° F. to form a catalyst slurry containing about 1 to 4 wt. percent of aluminum chloride, which catalyst slurry is then admixed in proportions of about 50 to 75% by weight of commercial hexane and 25 to 50% by weight of isobutylene at a temperature of about −75° to +10° F. for a period of time of about 0.2 to 4.0 hours to thereby effect the polymerization of said isobutylene, the improvement which comprises passing said commercial hexane, prior to admixture with said finely divided aluminum chloride catalyst, first through a bed of a solid alumina desiccant at a rate of about 0.1 to 20.0 v./v./hour, then through a bed of relatively coarse particles of aluminum chloride at a rate of about 0.25 to 50 v./v./hour and at a temperature of about 0° to 200° F. and subsequently through a bed of relatively coarse particles of bauxite at a rate of about 0.1 to 220.0 v./v./hour and at a temperature of about 0° to 200° F., the relatively coarse particles of aluminum chloride and alumina in said beds having a particle size of about 4 to 8 mesh, and periodically regenerating the alumina desiccant by heating it with a portion of the resulting substantially dry aluminum chloride treated hexane in superheated vapor form at a temperature between about 350° and 600° F. and subsequently cooling the desiccant with dry treated hexane liquid to a temperature between about 40° and 100° F.

9. Method according to claim 8 in which the hexane vapor is subsequently condensed, separated from entrained water, and recycled to a zone subsequent to the alumina desiccant bed.

10. Method according to claim 8 wherein the hexane vapor is superheated to a temperature between about 400° and 550° F.

11. Method according to claim 8 wherein said commercial hexane is passed through said beds at a rate of about 0.25 to 20.0 v./v./hour.

12. Method according to claim 8 wherein said commercial hexane has the following approximate composition:

| Component: | Volume percent |
|---|---|
| n-Hexane | 25–70 |
| Iso-hexanes | 5–35 |
| Benzene | 1–10 |
| $C_6$ cycloaliphatics | 10–60 |
| $C_6$ olefins | 0.1–3.0 |
| Iso-heptanes | 5–20 |

13. Method according to claim 8 wherein said commercial hexane is passed through said beds at a temperature of about 40° to 100° F.

14. Method according to claim 8 wherein the bed of alumina desiccant is regenerated after commercial hexane has been passed therethrough for between about 20 and 200 hours.

15. Method according to claim 8 wherein the regeneration is performed for a time between about 1 and 20 hours.

16. Method according to claim 8 wherein the regeneration is performed until the alumina desiccant is capable of maintaining the concentration of water in effluent hexane of less than about 10 parts per million.

17. Method according to claim 8 wherein the regeneration is accomplished at a temperature between about 400° and 550° F.

References Cited in the file of this patent

UNITED STATES PATENTS

| | | |
|---|---|---|
| 2,406,112 | Schulze | Aug. 20, 1946 |
| 2,484,384 | Levine | Oct. 11, 1949 |
| 2,535,902 | Dailey | Dec. 26, 1952 |
| 2,739,669 | Miller | Mar. 26, 1956 |
| 2,755,230 | Guernsey | Nov. 8, 1956 |